United States Patent [19]
Holmes

[11] 4,293,262
[45] Oct. 6, 1981

[54] REUSABLE PREVAILING TORQUE NUT

[76] Inventor: Horace D. Holmes, 28576 Green Willow, Farmington Hills, Mich. 48018

[21] Appl. No.: 46,736

[22] Filed: Jun. 8, 1979

[51] Int. Cl.³ .............................................. F16B 39/30
[52] U.S. Cl. .................................................. 411/311
[58] Field of Search ...................... 151/21 C, 22, 21 R, 151/21 B, 14 R, 7; 10/86 A; 85/46; 411/311, 310, 309, 308

[56] References Cited

U.S. PATENT DOCUMENTS

| | | | |
|---|---|---|---|
| 1,447,056 | 2/1923 | Bates | 151/22 |
| 2,255,384 | 9/1941 | Hood | 151/22 |
| 2,437,638 | 3/1948 | Evans | 151/22 |
| 3,323,402 | 6/1967 | Gowen, Jr. et al. | 85/46 X |
| 3,566,947 | 3/1971 | Jukes | 151/22 X |
| 4,171,012 | 10/1979 | Holmes | 151/22 X |

FOREIGN PATENT DOCUMENTS

| | | | |
|---|---|---|---|
| 26433 | of 1910 | United Kingdom | 151/21 C |
| 7162 | of 1912 | United Kingdom | 151/21 C |

*Primary Examiner*—Ramon S. Britts
*Attorney, Agent, or Firm*—Krass, Young & Schivley

[57] ABSTRACT

A prevailing torque nut in which part of the thread form is truncated to a partial depth to produce interference with a bolt crest engaged therewith. The nut body is thin-walled around the truncated threads such that the body can expand circumferentially to accommodate the larger bolt thread. The expansion is at least partly elastic to permit removal and reuse.

6 Claims, 3 Drawing Figures

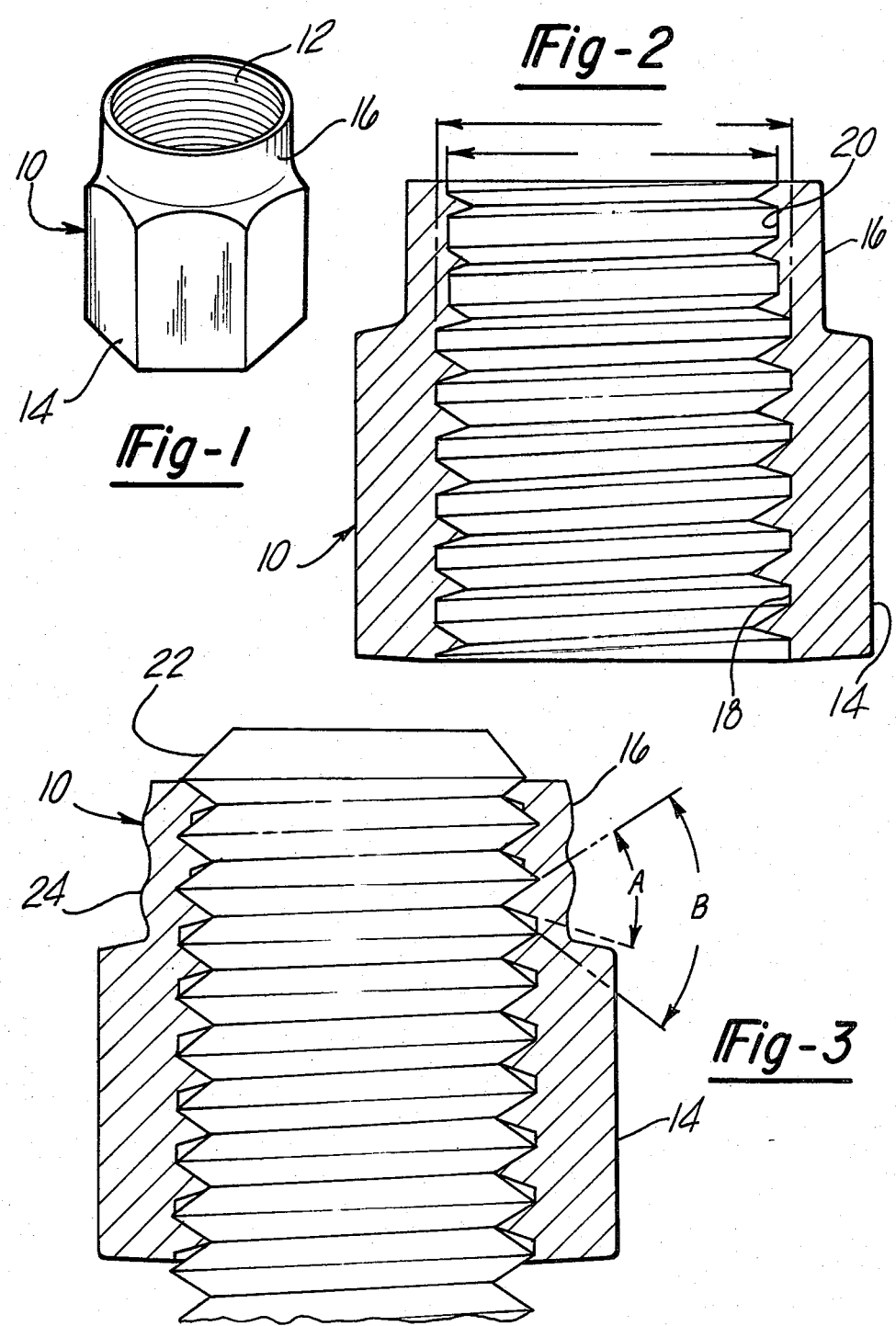

REUSABLE PREVAILING TORQUE NUT

INTRODUCTION

This invention relates to vibration resistant fasteners of the prevailing torque type.

BACKGROUND OF THE INVENTION

The prior art shows years of concern over the production of vibration resistant locking fastener combinations. Such expedients as lock washers, cotter pins, glue bonds, telescopically wedging surfaces and mechanical deformation have been used to prevent or resist loosening of the elements of a threaded fastener combination.

I have discovered that the key to a vibration resistant self-locking fastener combination lies in the realization of firm radial contact between the male and the female thread forms such that all lateral movement is constrained under vibration conditions. By eliminating the possibility for lateral shifting or relative movement between the thread forms the high friction condition which is characteristic of axial tension is maintained and the tendency for the threaded elements to unwind is minimized. I have embodied this concept in the device disclosed in my U.S. Pat. No. 4,150,702 which issued on Apr. 24, 1979. In my patent I disclosed a prevailing torque nut for use in combination with a standard bolt or stud and in which vibration resistance is achieved through firm radial engagement between the crest of the bolt thread and the root of at least a portion of the nut. Specifically, the nut thread exhibits normal thread depth over a portion of its length so as to easily accommodate the bolt thread therein, but a substantially reduced depth over the remainder of its length such that threading the elements fully together progressively drives the bolt thread crest against the truncated flat of the nut. As this occurs material is worked from the top of the bolt crest and the included angle of the nut flanks is made smaller than the included angle of the bolt flanks so as to provide clearance for material which is removed from the bolt thread form crest during the threading process.

Because the locking effect in the combination described above often involves non-elastic deformation of the bolt thread, repeated use of the nut through removal and reapplication is likely to cause a significant loss of vibration resistance and prevailing torque level. Accordingly, the prevailing torque nut fastener of the aforementioned patent is recommended only in those applications where the nut can be substantially permanently applied.

BRIEF SUMMARY OF THE INVENTION

In accordance with the present invention a prevailing torque nut is provided which can be applied, removed and reapplied several times without substantial loss of locking power and prevailing torque level. In general this is accomplished by means of a nut having a through-hole which is threaded substantially in accordance with the disclosure of my U.S. Pat. No. 4,150,702; i.e. the thread form within the nut body is characterized by a first axial length of substantially full depth threads and a second axial length contiguous with the first of partial depth so as to exhibit a truncated flat which is engaged by the crest of the male fastener thread form during threaded engagement to provide the prevailing torque and vibration resistant features. However, my present invention is further characterized by a nut body having first and second axial portions of substantially different radial compliance; i.e., the nut body length which corresponds to the full depth threads is of a first relatively stiff compliance and the second axial length which corresponds to the shallow thread depth is of a second greater radial compliance so as to permit circumferential expansion of the nut body in the area of reduced depth. By proper selection of the radial compliance, the radial interference between the male thread form crest and the truncated flat of the nut is accommodated at least partly by eleastic circumferential and radial expansion of the nut body. Accordingly, when the nut is removed the radially compliant portion of the nut body springs back substantially to its original condition and may be applied without substantial loss of prevailing torque level.

In the preferred form I achieved the axially different areas of radial compliance by regulating the external diameter and resulting wall thickness of the nut body so as to provide a thin wall over the area of high radial compliance and a thick wall over the area of low radial compliance. There are, of course, alternatives to this approach but I prefer varying the wall thickness as the most economical expedient from the manufacturing standpoint.

In accordance with a still feature of my invention I provide an included angle between flanks of the nut thread form which is greater than the included angle between flanks of the conjugal bolt thread form, thus to provide clearance between the flanks of the nut and bolt. I prefer that the difference in included angle be asymmetric such that the nut and bolt flanks which are driven together under axial load lie parallel to one another and actually engage when loaded to provide increased flank friction. Such an embodiment is disclosed herein.

BRIEF DESCRIPTION OF THE DRAWINGS

FIG. 1 is a perspective view of a nut embodying my invention;

FIG. 2 is a sectional view of the nut across corners and through a longitudinal diameter; and FIG. 3 is a second sectional view similar to that of FIG. 2 but illustrating a bolt in threaded engagement with the nut body so as to produce circumferential deformation of the nut body in the area of high radial compliance.

DETAILED DESCRIPTION OF THE SPECIFIC EMBODIMENT

Referring to the drawings, the invention is shown embodied in a cold formed steel nut 10 having a threaded throughhole 12. The nut body is characterized by a first axial length having external flats 14 and a second axial length 16 of substantially reduced wall thickness relative to the average thickness of the nut body wall in the area of the flats 14. The result of the significantly different wall thickness is a substantially proportional difference in radial compliance, the radial compliance of axial length 16 being substantially greater than the radial compliance of the nut body in the area of the flats 14.

As shown in FIG. 2, the threaded hole 12 comprises a portion coextensive with the flats 14 having full depth threads 18 and, contiguous therewith and coextensive with the reduced diameter barrel section 16, a length of substantially reduced thread depth 20. The pitch and minor thread diameter of the nut body 10 are constant throughout the effective length thereof.

FIG. 3 illustrates the effect of engaging the nut body 10 of FIGS. 1 and 2 with a standard bolt 22. As the bolt 22 is threaded into the nut 10 a substantially free-running engagement is experienced over the initial or full depth portion 18 of the nut thread form. However, the bolt thread form ultimately reaches the reduced depth thread portion 20 where substantial mechanical interference between the crest of the bolt thread form and the helical flat of the reduced diameter portion 20 occurs; this is a progressive rather than stepwise change in thread depth and hence the prevailing on-torque rises progressively as the bolt crest engages the flat 20 of the nut. Although some deformation of the bolt crest may occur, depending upon the relative hardnesses and the specific desires of the fastener engineer who selects components for a given application, the greatest portion of the mechanical interference between the bolt crest and the nut body is taken up by radial and circumferential expansion of the increased compliant portion 16 of the nut body, as shown in FIG. 3. This is preferably primarily an elastic circumferential expansion such that backing the nut 10 off of the bolt 22 results in a substantial relaxation of the areas 24 of circumferential deformation. It is anticipated that some hysteresis due to non-elastic expansion will be inevitable but by careful selection of the materials and wall thicknesses the greatest portion of the circumferential deformation 24 can be caused to relax as the nut and bolt are separated. Accordingly, the nut and bolt may be reassembled with substantially retained prevailing torque level and locking characteristics.

As shown in FIG. 3, the flank angles of the nut 10 are non-standard and asymmetric. The included angle A of the nut flanks is smaller than the standard included angle B of the bolt flanks by about 15°. Moreover, the angle of the leading flank of the nut 10, relative to the longitudinal thread form axis, is steeper by about 15° than the flank angle of the corresponding bolt flank so as to provide a significant clearance therebetween. The other corresponding flanks of the nut and bolt lie parallel to one another such that flank-to-flank engagement occurs upon axial loading as is fully illustrated in FIG. 3. The clearance between the non-engaging flanks provides room for any material which might be deformed from the bolt crest and the flank-to-flank engagement of the mating flanks provides increased off-torque which is desirable in a prevailing torque fastener.

The nut 10 which is shown in the drawings may be cold formed and I prefer this method as the most economical approach to manufacture of this product. However, it is possible to achieve the differing wall thicknesses illustrated in FIGS. 1 through 3 by means of a secondary operation such as milling or turning the nut body. I have found that such operations also tend to remove the cold worked skin of the nut and make the nut body somewhat softer in the increased compliance area 16. It is possible to achieve variations in compliance by expedients other than varying external diameters; for example, it is possible by secondary operations to relieve the interior of the nut body between the exterior surface and the threaded hole by drilling a circular pattern of small diameter holes into the top end of the nut body shown in FIG. 2. At least at the present time such an operation is unattractive from the standpoint of economy of manufacture but I include a description of same to illustrate that alternative methods of achieving variations in radial compliance do exist.

The embodiment of the invention in which an exclusive property or privilege is claimed are defined as follows:

1. A prevailing torque female fastener element for use in combination with a male threaded element having a standard thread form with standard flank angles, said female element comprising a nut body having a threaded hole at least partly therethrough, the threaded hole being characterized by a thread form having a first depth along a first portion thereof and a second reduced thread depth along a second portion contiguous with the first portion, said second reduced depth being formed by a truncation of the thread flanks thereby to define a flat surface of truncation at the major diameter of said second portion, the nut body being constructed to exhibit greater radial compliance in the portion of reduced thread depth, the increased radial compliance being achieved by a reduced wall thickness in the nut body surrounding the portion of reduced thread depth, thus to permit radial and circumferential expansion of the nut body when engaged with a male fastener element or standard thread form, at least the trailing flank angle of the nut body being greater than the corresponding mating flank angle of a standard male thread form so as to provide longitudinal clearance therebetween when threadedly engaged.

2. Apparatus as defined in claim 1 wherein the leading and trailing flank angles of the nut are unequal over the length thereof.

3. Apparatus as defined in claim 1 wherein the trailing flank angle of the nut body is greater than the corresponding mating flank angle of said standard male thread by approximately 15°.

4. A prevailing torque female fastener element for use in combination with a male threaded element having a standard thread form with standard flank angles, said female element comprising a nut body having a threaded hole at least partially therethrough, the threaded hole being characterized by a thread form having a first depth along a first portion thereof and a second reduced thread depth along a second portion thereof contiguous with the first portion, said second reduced depth being formed by a truncation of the thread flanks thereby to define a flat surface of truncation at the major diameter of said second portion, the said nut body being constructed to exhibit greater radial compliance in the portion of reduced thread depth, at least the trailing flank angles of said nut body being greater than the corresponding mating flank angles of a standard male thread form threadedly engaged therewith so as to provide longitudinal clearance therebetween.

5. The fastener of claim 4, wherein the leading and trailing flank angles of said nut body are unequal over the length thereof.

6. Apparatus as defined in claim 4 wherein the trailing flank angle of the nut body is greater than the corresponding mating flank angle of said standard male thread by approximately 15°.

* * * * *